United States Patent [19]

Leung

[11] Patent Number: 5,729,729

[45] Date of Patent: Mar. 17, 1998

[54] SYSTEM FOR FAST TRAP GENERATION BY CREATION OF POSSIBLE TRAP MASKS FROM EARLY TRAP INDICATORS AND SELECTING ONE MASK USING LATE TRAP INDICATORS

[75] Inventor: Arthur T. Leung, Sunnyvale, Calif.

[73] Assignee: Sun Microsystems, Inc., Palo Alto, Calif.

[21] Appl. No.: 664,477

[22] Filed: Jun. 17, 1996

[51] Int. Cl.⁶ ............................................. G06F 9/00
[52] U.S. Cl. ................................. 395/591; 395/565
[58] Field of Search ........................ 395/591, 565, 395/569

[56] References Cited

U.S. PATENT DOCUMENTS

| | | | |
|---|---|---|---|
| 3,883,851 | 5/1975 | Drake et al. | 395/565 |
| 5,193,158 | 3/1993 | Kinney et al. | 395/591 |
| 5,237,700 | 8/1993 | Johnson et al. | 395/591 |
| 5,341,482 | 8/1994 | Cutler et al. | 395/591 |
| 5,481,685 | 1/1996 | Nguyen et al. | 395/591 |

*Primary Examiner*—Richard L. Ellis
*Attorney, Agent, or Firm*—Townsend and Townsend and Crew LLP

[57] ABSTRACT

An improved method and apparatus for ordering traps in a multiscalar design to avoid pipeline delays. Execution units which generate their traps earlier in the pipeline are used to build a number of possible enable masks, for indicating which instructions should complete, using the ordering information available from the different execution units. The enable masks cover the different possibilities of trap or no trap for the execution units which produce later traps. The traps from the execution units providing a later trap indication then select from the possible enable masks depending upon whether or not a trap is indicated by such second group of execution units. The enable mask is then used to enable or disable the destination registers used by the different execution units for that group of instructions.

20 Claims, 3 Drawing Sheets

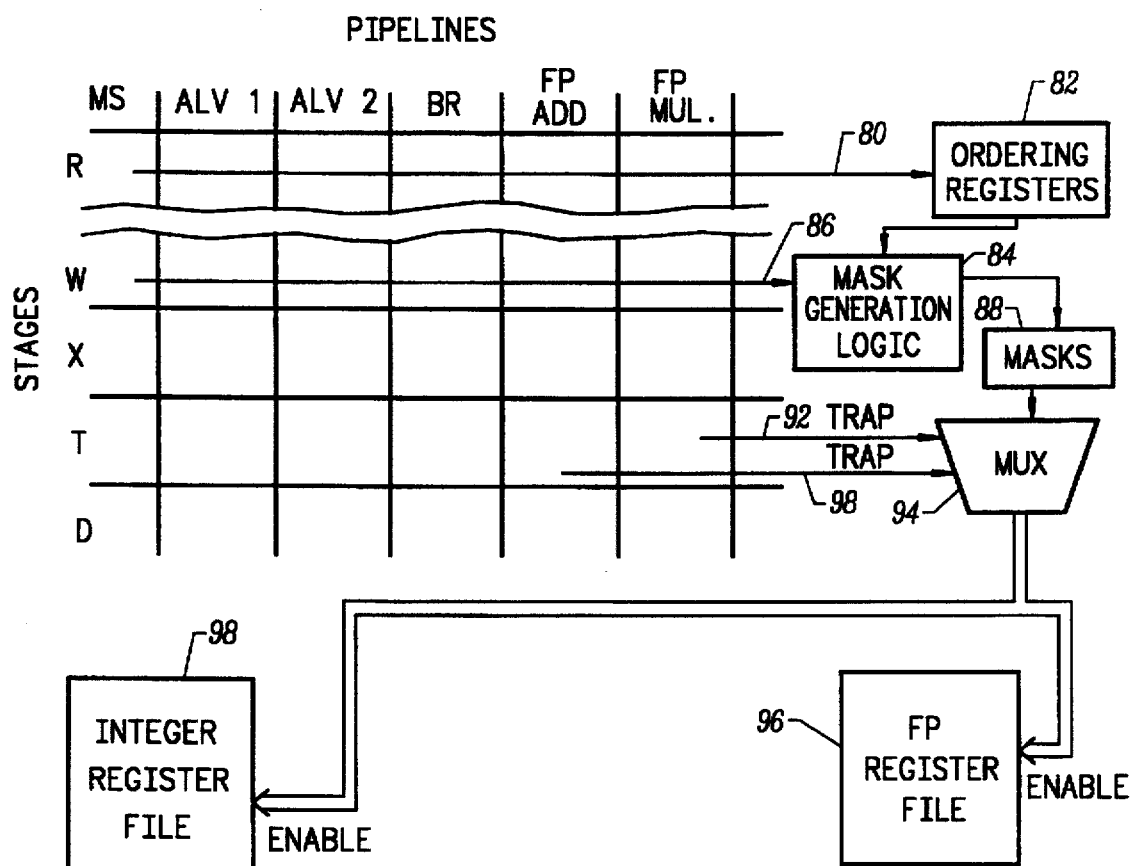

SYSTEM FOR FAST TRAP GENERATION BY CREATION OF POSSIBLE TRAP MASKS FROM EARLY TRAP INDICATORS AND SELECTING ONE MASK USING LATE TRAP INDICATORS

BACKGROUND OF THE INVENTION

The present invention relates to trap ordering in a multiscalar microprocessor design.

In microprocessors, traps may be generated by the execution of certain instructions. A trap behaves like an unexpected procedure call, causing the hardware to save certain processor state information and to cause a vectored transfer of control to supervisor software.

In pipelined processors, execution of instructions after the instruction causing the trap must be stopped, while instructions preceding the trap should be completed. In multiscalar designs, multiple execution units are executing pipelined instructions in parallel, and thus it is necessary to determine the order in which the instructions issued so that it can be determined which instructions should complete and which should be stopped.

A complication of such trap ordering is that some classes of traps are detected late in the pipeline. Historically, the trap cycle of the pipeline is the last or next to the last cycle in the pipeline. If the ordering architecture is not fast enough, an additional cycle may need to be added to the pipeline in order to resolve the trap order, at the cost of additional time for execution, additional area used in the data path, additional interconnects, and increased logic complexity.

SUMMARY OF THE INVENTION

The present invention provides an improved method and apparatus for ordering traps in a multiscalar design to avoid pipeline delays. Execution units which generate their traps earlier in the pipeline are used to build a number of possible enable masks, for indicating which instructions should complete, using the ordering information available from the different execution units. The enable masks cover the different possibilities of trap or no trap for the execution units which produce later traps. The traps from the execution units providing a later trap indication then select from the possible enable masks depending upon whether or not a trap is indicated by such second group of execution units. The enable mask is then used to enable or disable the destination registers used by the different execution units for that group of instructions.

In a preferred embodiment, the execution units providing the late trap indications are the floating point add and floating point multiply units. The trap outputs from the floating point units then select among the possible enable masks. Preferably, the enable masks are completed before the cycle in which the floating point traps are generated, but not more than one cycle before, so that they do not need to be retained in memory for additional cycles. In one embodiment, a recirculate trap for the floating point unit is generated earlier and is used as part of the formation of the possible enable masks.

For further understanding of the nature and advantages of the invention, reference should be made to the following description taken in conjunction with the accompanying drawings.

BRIEF DESCRIPTION OF THE DRAWINGS

FIG. 3 is a diagram illustrating the logic of the present invention and the different pipeline stages for different execution units providing trap outputs; and FIG. 4 is a diagram illustrating one example of possible enable masks generated according to the present invention.

DESCRIPTION OF THE PREFERRED EMBODIMENT

Figure 1:
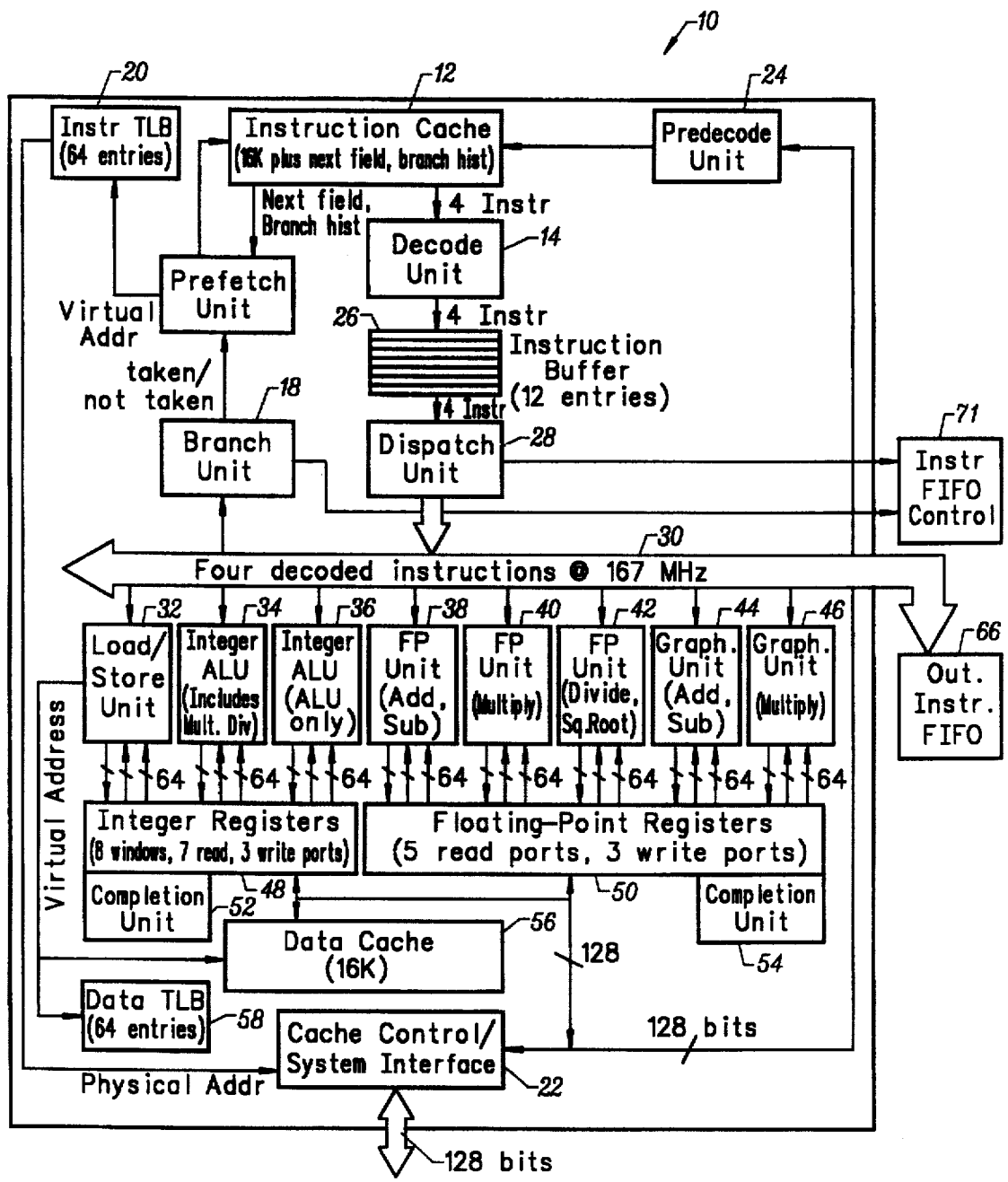
FIG. 1 is a block diagram of an UltraSparc™ microprocessor into which the present invention may be incorporated.

FIG. 1 is a block diagram of an UltraSparc™ microprocessor 10 which could be modified to incorporate the present invention. An instruction cache 12 provides instructions to a decode unit 14. The instruction cache can receive its instructions from a prefetch unit 16, which either receives instructions from branch unit 18 or provides a virtual address to an instruction TLB (translation look-aside buffer) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data dependencies and availability of the proper functional unit.

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

An outstanding instruction FIFO 66 contains information on each instruction in the function unit pipeline. It is controlled by instruction FIFO control logic 71.

Figure 2:
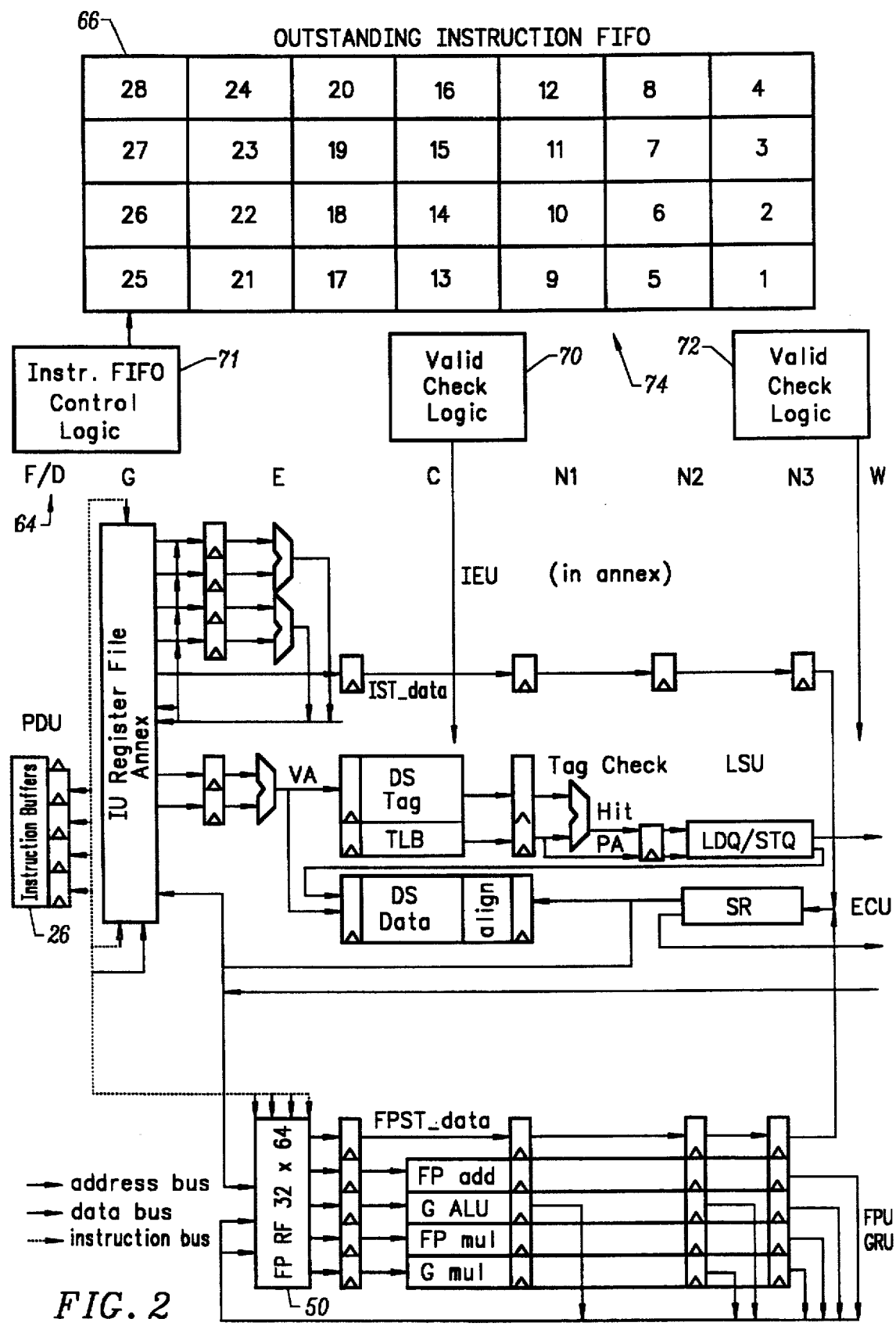
FIG. 2 is a block diagram illustrating the different pipeline stages of the microprocessor of FIG. 1.

FIG. 2 illustrates in more detail the stages of some of the pipelines of FIG. 1. In particular, the floating point registers 50 are shown at the bottom, with the 5 floating point and graphical functional units being shown. The different stages of the pipeline are illustrated by the letters in line 64 in the middle of the diagram. At the top of FIG. 2, an outstanding instruction FIFO 66 is illustrated. As shown, the FIFO has 7 rows corresponding to 7 stages or cycles of the pipeline, with corresponding instructions being stored in 4 positions in each row, extending from 1 through 28 as shown. Each row thus stores an instruction group. The instructions corresponding to the positions in the FIFO will be found in the pipeline at the same cycle in the functional units. Instruction FIFO control logic 71 controls the operation of outstanding instruction FIFO 66.

The different stages shown are as follows. F/D stage is the stage where instructions are fetched form the cache. The D portion of this stage is for decoding of instructions and placing them in the instruction buffer 26. In stage G, up to 4 instructions, depending upon data dependency and functional unit requirements, are dispatched and the register files are accessed. Note that less than 4 instructions may be sent depending upon data dependencies, if the data needed by an instruction is not yet available. Alternately, if multiple instructions require the same functional unit, less than 4 instructions may be dispatched if an equivalent function unit is not available.

In stage E, execution occurs in the ALU, and the memory address is calculated. In stage C, the FPU calculation is started and the on-chip data cache and TLB are checked. Stage N1 is the second stage of the floating point calculation, and stage N2 is a floating point unit completion stage. Stage N3 allows a resolution of traps or errors and stage W is for the writing back of results to the register files.

Two sets of valid check logic are provided, a valid check logic 70 and valid check logic 72. Valid check logic 70 determines whether the instructions in the fourth stage of the pipeline, indicated as 74 in outstanding instruction FIFO 66, are valid. At this point, if the instructions are invalidated, the accessing of off-chip memory and its associated requirement of many cycles is avoided.

Valid check logic 72 determines at the output of the pipeline whether the instructions are valid to prevent invalid results being written into the register files.

Whether a branch has been correctly predicted is determined by the branch resolution logic, which is commonly implemented in the branch unit. This logic provides the actual input signal to change the valid bits in outstanding instruction FIFO 66. This type of logic has been used to invalidate instruction groups following a group having a branch.

FIG. 3 illustrates a slightly different pipeline in which the stages are labeled R, E, C, M, W, X, T and D. A number of exemplary execution units are illustrated, with a memory store execution unit (MS), two integer ALUs (ALU1, ALU2), a branch unit (BR) and two floating point units (FP ADD, FP MUL.). As can be seen, in the first stage R of the pipelines, lines 80 provide ordering information to ordering registers 82 from each of the execution units. The ordering information indicating the order in which the instructions were issued relative to each other is provided from the dispatch unit to the individual execution units along with the instructions themselves. As the instructions propagate to different stages in the pipeline, new instructions are received, additional ordering information is provided in registers 82, with the registers maintaining information for outstanding instructions in a pipeline up to the subsequent stages discussed below.

At the stage W, the traps for most execution units are available, and are provided to mask generation logic 84 via lines 86. In addition to the trap outputs for most of the units, the floating point units provide a recirculation trap to the mask generation logic. Based upon which execution units are providing a valid trap indication, and the order of the instructions, the mask generation logic 84 determines which instructions are to be completed and which are not, based upon whether they are before or after the trapping instruction. This information is then written into mask registers 88.

At a subsequent stage, T, of the pipeline, the trap output lines are available from the floating point ADD and floating point MULTIPLY units on lines 90 and 92, respectively. These are provided as select inputs to a multiplexor 94 which selects particular ones of the enable masks from registers 88 to be provided as enable inputs for floating point register file 96 and integer register file 98.

FIG. 4 sets forth an example of how the enable masks are generated according to the present invention. In a first row 100, the individual execution units are designated. A second row 102 illustrates examples of particular instruction operations provided to the different execution units. Note that five instruction operations are provided in parallel, with the floating point ADD execution unit not having any instruction for this cycle. The order in which the instructions were dispatched is shown in row 104. As can be seen, the ADD instruction in ALU2 was dispatched first, with order 100, with the SUBTRACT instruction in ALU1 being dispatched last, having order 110.

Row 106 illustrates whether a trap output is generated or not. As can be seen, of the first four execution units, only the branch unit is indicated as generating a trap in this example.

Mask register 88 is shown below, with a first and second row 108 and 110 illustrating the two possible enable masks which should be generated. Only two masks are possible, rather than four, since the floating point ADD unit has no instruction in this example. The mask in row 108 is the mask that would be generated if the floating point MULTIPLY does not issue a trap signal subsequently. The mask in row 110 is the mask that would be generated if the floating point MULTIPLY unit does issue a trap instruction. The different possible combinations of traps being issued by the floating point ADD and floating point MULTIPLY units are shown in the four rows of block 112, with the codes corresponding to the associated row. As can be seen, the last two combinations are not possible since there is no floating point ADD instruction in this cycle.

As can be seen, row 108 provides that the instruction in the branch unit which generated the trap output should be completed, along with the earlier issued instruction in ALU2. However, the remaining instructions, which are subsequent to the branch instruction, are invalidated by having zeroes written to them in the mask. On the other hand, in row 110 it is illustrated that if the floating point MULTIPLY issues a trap, then all instructions up to it are issued, which in this example only includes in addition the floating point MULTIPLY instruction itself. The particular one of the masks in rows 108, 110 (or 112 and 114, where applicable) are selected by the inputs from the floating point ADD and floating point MULTIPLY to multiplexor 94.

Referring back to FIG. 3, the trap outputs generated in stage W allow one cycle for the logic to determine from the trap outputs and the ordering information the appropriate instructions to be invalidated. In a next stage, X, the results can be written to the mask registers 88. Since the instructions are following through the pipeline with a new set of instructions each cycle replacing the previous ones in each stage, it is preferable to have the mask information generated in the cycle immediately preceding when the selection is done in cycle T, and not more cycles earlier. If the masks were generated more cycles earlier, multiple masks would have to be maintained as different instructions propagated through the stages.

The actual bits used to enable the register files can be considered the inversion of KILL masks for killing particular instructions. The inversion logic would not actually be used because of the added time delay, but the logic can output non-inverting and inverting versions.

As will be understood by those with skill in the art, the present invention may be embodied in other specific forms without departing from the spirit or central characteristics thereof. For example, the present invention applies to any type of exceptions to the normal execution of instructions. In addition to traps, branches, cache misses, or other exceptional conditions can be used to provide inputs to the enable mask of the present invention. Accordingly, the foregoing description is meant to be illustrative, but not limiting, of the scope of the invention which is set forth in the following claims.

What is claimed is:

1. A microprocessor comprising:

a plurality of pipelined execution units, including a first group of early trap generation execution units and a second group of late trap generation execution units;

ordering registers, coupled to said pipelined execution units, configured to store an order of issuance of instructions into said execution units;

mask generation logic, coupled to said first group of said execution units and to said ordering registers, configured to generate a plurality of possible enable masks from a first set of trap outputs generated by said plurality of execution units; and selection logic, coupled to said mask generation logic and at least one trap output of a second set of trap outputs from said second group of execution units, configured to select a single enable mask from said plurality of possible enable masks.

2. The microprocessor of claim 1 wherein said second group of execution units includes at least one floating point unit.

3. The microprocessor of claim 2 wherein said second group of execution units includes a floating point add execution unit and a floating point multiply execution unit.

4. The microprocessor of claim 1 wherein said first set of trap outputs includes recirculation trap outputs.

5. The microprocessor of claim 4 wherein at least one of said recirculation trap outputs is from said second group of execution units.

6. The microprocessor of claim 1 wherein mask generation logic is configured to generate said possible enable masks one clock cycle prior to the availability of a signal on said trap output of said second set of trap outputs.

7. The microprocessor of claim 1 further comprising:

a plurality of mask registers storing said enable masks; and at least one register file having enable inputs coupled to said mask registers.

8. The microprocessor of claim 1 wherein said selection logic comprises a multiplexer.

9. The microprocessor of claim 1 wherein said second set of execution units includes a graphics processing execution unit.

10. A microprocessor comprising:

a plurality of pipelined execution units, including a first group of early trap generation execution units and a second group of late trap generation execution units, said second set including at least one floating point execution unit;

ordering registers, coupled to said pipelined execution units, configured to store an order of issuance of instructions into said execution units;

mask generation logic, coupled to said first group of said execution units and to said ordering registers, configured to generate a plurality of possible enable masks from a first set of trap outputs generated by said plurality of execution units, said first set of trap outputs including a recirculation trap output from said floating point execution unit, wherein said mask generation logic is configured to generate said possible enable masks one clock cycle prior to the availability of a signal on said trap output of said second set of trap outputs; and selection logic, coupled to said mask generation logic and at least one trap output of a second set of trap outputs from said second group of execution units, configured to select a single enable mask from said plurality of possible enable masks.

11. The microprocessor of claim 10 further comprising:

a plurality of mask registers storing said enable masks; and at least one register file having enable inputs coupled to said mask registers.

12. The microprocessor of claim 10 wherein said selection logic comprises a multiplexer.

13. The microprocessor of claim 10 wherein said second set of execution units includes a graphics processing execution unit.

14. A method for operating a microprocessor comprising the steps of:

providing instructions in parallel to a plurality of pipelined execution units, including a first group of early trap generation execution units and a second group of late trap generation execution units;

storing, in ordering registers, an order of issuance of instructions into said execution units;

generating a plurality of possible enable masks from a first set of trap outputs generated by said plurality of execution units; and selecting a single enable mask from said plurality of possible enable masks.

15. The method of claim 14 wherein said second group of execution units includes at least one floating point unit.

16. The method of claim 15 wherein said second group of execution units includes a floating point add execution unit and a floating point multiply execution unit.

17. The method of claim 14 wherein said first set of trap outputs includes recirculation trap outputs.

18. The method of claim 17 wherein at least one of said recirculation trap outputs is from said second group of execution units.

19. The method of claim 14 further comprising the step of generating said possible enable masks one clock cycle prior to the availability of a signal on said trap output of said second set of trap outputs.

20. The method of claim 14 further comprising the step of setting valid bits of a register file with said selected enable mask.

* * * * *